(12) United States Patent
Adar et al.

(10) Patent No.: US 7,389,290 B2
(45) Date of Patent: Jun. 17, 2008

(54) SYSTEM AND METHOD FOR SCORING NEW MESSAGES BASED ON PREVIOUS RESPONSES WITHIN A SYSTEM FOR HARVESTING COMMUNITY KNOWLEDGE

(75) Inventors: Eytan Adar, Palo Alto, CA (US); Rajan Mathew Lukose, Palo Alto, CA (US); Joshua Rogers Tyler, Stanford, CA (US); Caesar Sengupta, Los Altos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1234 days.

(21) Appl. No.: 10/210,331

(22) Filed: Jul. 31, 2002

(65) Prior Publication Data
US 2004/0024718 A1 Feb. 5, 2004

(51) Int. Cl.
*G06F 17/30* (2006.01)
(52) U.S. Cl. .......................................... 707/7; 709/229
(58) Field of Classification Search ........................ None
See application file for complete search history.

(56) References Cited

U.S. PATENT DOCUMENTS

| | | | | |
|---|---|---|---|---|
| 5,689,708 | A * | 11/1997 | Regnier et al. | 709/229 |
| 6,092,101 | A | 7/2000 | Birrell et al. | |
| 6,915,284 | B2 | 7/2005 | Adar et al. | |
| 7,246,121 | B2 | 7/2007 | Adar et al. | |
| 2003/0172067 | A1 | 9/2003 | Adar et al. | |
| 2003/0204581 | A1 | 10/2003 | Adar et al. | |
| 2003/0204604 | A1 | 10/2003 | Adar et al. | |
| 2003/0217106 | A1 | 11/2003 | Adar et al. | |
| 2004/0024719 | A1 | 2/2004 | Adar et al. | |

OTHER PUBLICATIONS

Pending Patent Application entitled: "System and Method for Harvesting Community Knowledge" U.S. Appl. No. 10/093,658, filed Mar. 7, 2002. Inventors: Eytan Adar et al.
Pending Patent Application entitled:"System and Method for Scoring Messages Within a System for Harvesting Community Knowledge" Serial Number: Unknown, Filed Jul. 31, 2002. Inventors: Eytan Adar et al.
Adriana Vivacqua & Henry Lieberman—"Agents to Assist in Finding Help"—2002—pp. 65-72.
Webpage—Gnutella "http://gnutella.wego.com/"—a widely known peer-to-peer network, (no day on the NPL).
Webpage—Freenet "http://freenet.sourceforge.net/"—peer-to-peer architecture for file sharing, (no day on the NPL).
Mark S. Ackerman & David W. McDonald—"Answer Garden 2: Merging Organizational Memory With Collaborative Help"—1996—pp. 97-105, (no days on the NPL).

(Continued)

*Primary Examiner*—Charles Rones
*Assistant Examiner*—Belix M Ortiz (57) ABSTRACT

A system and method for privacy-preserving knowledge management is disclosed. The method of the present invention discloses: generating a client computer profile from a set of data items on a client computer; generating a set of message response profiles from a corresponding set of message responses; generating a set of new message profiles from a corresponding set of new messages; storing the profiles on the client computer; and scoring a new message with respect to the client and message response profiles. The system of the present invention, discloses means for implementing the method.

17 Claims, 5 Drawing Sheets

OTHER PUBLICATIONS

David W. McDonald & Mark S. Ackerman—"Expertise Recommender: A Flexible Recommendation System and Architecture"—Dec. 2000—pp. 231-240.

Leonard N. Foner—"Yenta: A Multi-Agent, Referral-Based Matchmaking System"—1997—pp. 301-307.

Nathaniel S. Borenstein—"Computational Mail as Network Infrastructure for Computer-Supported Cooperative Work"—Nov. 1992—pp. 67-74.

Michael K. Reiter and Aviel D. Rubin—"Crowds: Anonymity for Web Transaction"—pp. 1-23, (no days on the NPL).

Dawit Yiman-Seid & Alfred Kobsa—"Expert Finding Systems for Organizations: Problems and Domain Analysis and the DEMOIR Approach"—pp. 1-23, (no days on the NPL).

Expert-finding systems (such as www.exp.com, www.keen.com)—enable individuals to find experts to answer questions, (no days on the NPL).

\* cited by examiner

SYSTEM AND METHOD FOR SCORING NEW MESSAGES BASED ON PREVIOUS RESPONSES WITHIN A SYSTEM FOR HARVESTING COMMUNITY KNOWLEDGE

CROSS-REFERENCE TO CO-PENDING APPLICATIONS

This application relates to and incorporates by reference co-pending U.S. patent application Ser. No. 10/093,658, entitled "System And Method For Harvesting Community Knowledge," filed on Mar. 7, 2002, by Adar et. al.; and Ser. No. 10/210,593, entitled "System And Method For Scoring Messages Within A System For Harvesting Community Knowledge," filed on or about Jul. 31, 2002, by Adar et. al. These related applications are assigned to Hewlett-Packard Co. of Palo Alto, Calif.

BACKGROUND OF THE INVENTION

1. Field of the Invention

The present invention relates generally to systems and methods for information sharing and knowledge management, and more particularly for scoring new messages based on previous responses within a system for harvesting community knowledge.

2. Discussion of Background Art

Satisfying information needs in a diverse, heterogeneous information environment is challenging. In order to even begin the process of finding information resources or answers to questions, individuals typically must know either where to look, or whom to ask. This is often a daunting task, especially in large enterprises where many of the members will not know each other, nor be aware of all the information resources potentially at their disposal. In such situation, individuals often present their questions and messages in a somewhat haphazard manner to others who may or may not be able to answer them. When the wrong person is asked the question, or presented with the message, that person's valuable time is wasted. This is equivalent to receiving "spam" in an electronic mail system.

Current systems for storing information and/or organizational expertise include Knowledge Databases (K-bases), such as document repositories and corporate directories, and Knowledge Management systems, which rely on users to explicitly describe their personal information, knowledge, and expertise to a centralized K-base.

Figure 1:
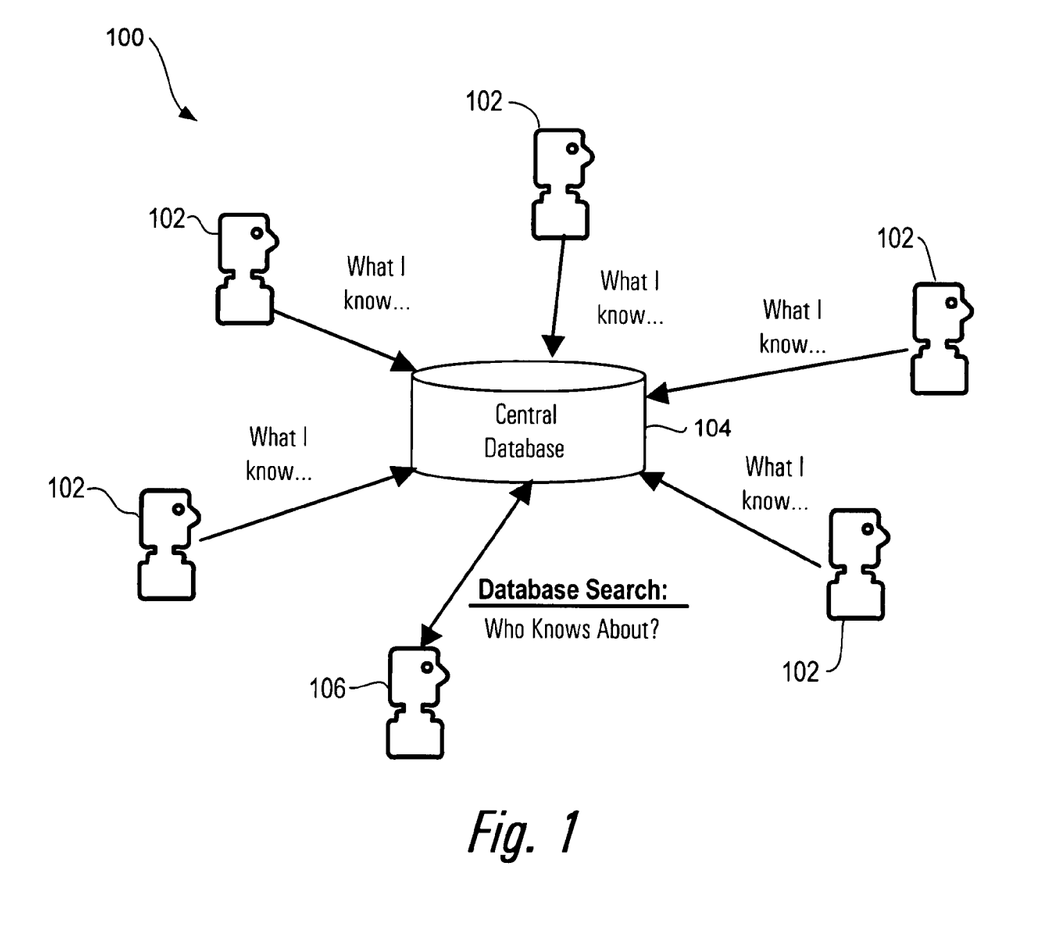
FIG. 1 is a dataflow diagram of a conventional system for knowledge management.

FIG. 1 is a dataflow diagram of a conventional knowledge management system 100. In a typical architecture, information providing users 102 explicitly decide what descriptive information they provide to a central database 104. An information seeking user 106 then performs a query on the central database 104 in order to find an information provider who perhaps may be able to answer the seeker's question.

There are several significant problems with such systems. First, knowledge management systems, like that shown in FIG. 1, require that information providers spend a significant amount of time and effort entering and updating their personal information on the central database 104. For this reasons alone, such systems tend to have very low participation rates. In addition, even those information providers, who take time to enter and update this information, may misrepresent their personal information or level of knowledge and expertise be it willfully or not. Furthermore, they may neglect or be unable to reveal much of their tacit knowledge within their personal description. Tacit knowledge is knowledge a user possesses, but which the user either does not consider important enough to enter, or which they may not even be consciously aware that they know.

Another problem is an information provider's lack of privacy with respect to their personal information stored on the central database 104. No matter what agreements a knowledge management system's central database 104 provider has made with the user, the fact remains that the central database 104 provider still has the user's personal information, which means that that personal information is out of the direct control of said user. As a result, information providers may be unwilling to reveal much about themselves in the presence of a risk that their privacy would be violated. In such systems, the provider must pre-screen all information to be revealed, in order to make sure that the information provided does not contain information which the user would not be comfortable with others having access to. The resulting high participation costs often results in profiles that are stale and lack richness.

Another problem with such systems, is their lack of anonymity. Information seekers and providers cannot remain anonymous while performing queries or asking questions. As such, they may not perform a search, as a question, or wholeheartedly reveal their knowledge about a particular topic in their response to another user's question.

All of the above problems lead to free-riding by many of those using such conventional knowledge management systems. Free-riders are those who benefit from information resources but who do not themselves provide information for the benefit of others. Free-riding tends to make all users worse off, since a knowledge management system's and K-base's value depends upon the richness and fidelity of each users' contributions.

Conventional centralized systems also require installation of additional hardware dedicated to the knowledge management system and do not make use of otherwise unutilized resources such as the user's own personal computer.

In response to the concerns discussed above, what is needed is a system and method for harvesting community knowledge that overcomes the problems of the prior art.

SUMMARY OF THE INVENTION

The present invention is a privacy-preserving system and method for knowledge management. A first embodiment of the method of the present invention includes the elements of, generating a client computer profile from a set of data items on a client computer; generating a set of message response profiles from a corresponding set of message responses; generating a set of new message profiles from a corresponding set of new messages; storing the profiles on the client computer; and scoring a new message with respect to the client and message response profiles.

A second embodiment of the present invention additionally includes the elements of, increasing a new message's score if the new message is related to a predetermined number of message responses having the message answered attribute; and decreasing a new message's score, if the new message is related to a predetermined number of message responses having the message deleted without response attribute.

A third embodiment of the present invention additionally includes the elements of, identifying a set of received message responses corresponding to a new message, from within the message responses; adding a response count attribute to a new message profile corresponding to the new message; and incrementing the response count attribute by one for each received message response in the set of received message responses.

A fourth embodiment of the present invention additionally includes the elements of, calculating an elapsed time since a new message is first received by the client computer; retrieving the new message's response-count from the client profile; and periodically increasing the new message's score by a predetermined amount, if the new message's response-count during the elapsed time is less than a predetermined minimum count; or periodically decreasing the new message's score by a predetermined amount, if the new message's response-count during the elapsed time is greater than a predetermined maximum count.

The system of the present invention, includes all means for implementing the method.

These and other aspects of the invention will be recognized by those skilled in the art upon review of the detailed description, drawings, and claims set forth below.

DETAILED DESCRIPTION OF THE PREFERRED EMBODIMENT

Figure 2:
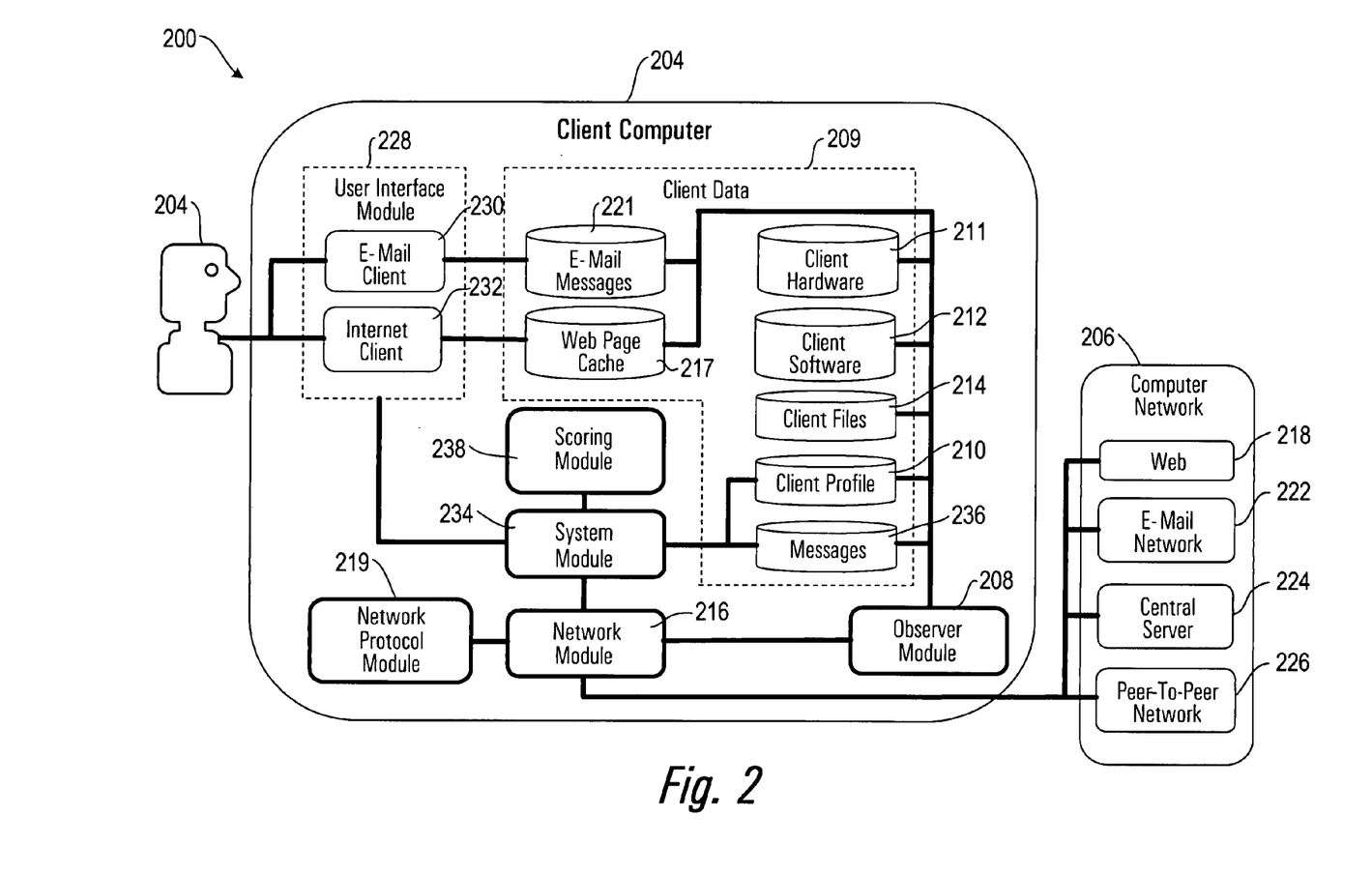
FIG. 2 is a dataflow diagram of one embodiment of a system for profiling clients within a system for harvesting community knowledge.
Figure 3:
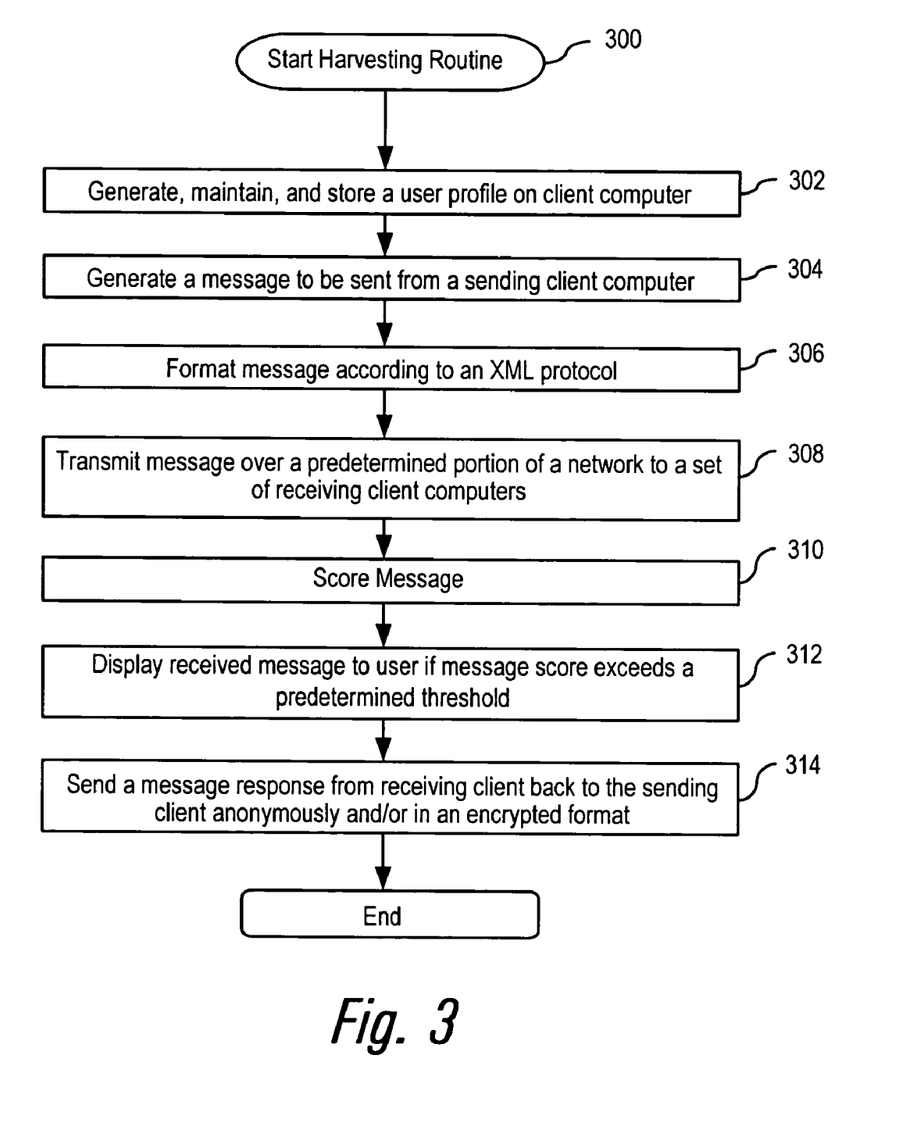
FIG. 3 is a flowchart of one embodiment of a method for harvesting community knowledge.

FIG. 2 is a dataflow diagram of one embodiment of a system 200 for harvesting community knowledge. FIG. 3 is a flowchart of one embodiment of a method 300 for harvesting community knowledge. FIGS. 2 and 3 are herein discussed together. The system 200 includes a client computer 202 under the control of a user 204, and connected to a computer network 206. The client 202 both sends and receives messages respectively to and from other client computers and information sources via the network 206. When a client computer generates and sends a message such client computer is herein alternately called a sending client, and when a client computer receives a message, such client computer is herein alternately called a receiving client. Preferably all client computers on the network include the same functionality, which is now described with respect to the client computer 202, however some receiving clients may not currently have the present invention's software installed.

User Profiling

User profiling by the present invention, enables the system 200 to capture historical information about the user 204, as well as real-time information as the user 204 goes about their daily digital business. This knowledge is expressed indirectly in the user's 204 behavior and data stored on the client computer 202 and from the user 204 and client computer 202 interactions with the network 206.

The present invention uses an observer module 208 to automatically compile and store user profile information in a client profile 210. The client profile 210 is generated using systematic, objective and repeatable methods which can be adjusted and modified to suit any number of user environments and/or information processing end goals. Since the client profile 210 is automatically created, the user 204 is relieved from the arduous task of having to manually build their own profile. This dramatically reduces participation costs for all users of the present invention, while ensuring that the user's profile is constantly kept up to date.

Preferably, more than one data source or set of data items are profiled in order to generate a multi-dimensional understanding of the user's 204 knowledge and that the resultant user profile is of a high quality. This is because singular sources of data, such as e-mail, tend not to fully reflect a user's interests and expertise. Also, since user profiles are preferably generated on each user's own computer 202, no new hardware resources need be purchased in order to implement the present invention.

The method 300 begins in step 302 with the observer module 208 generating and maintaining the client profile 210 on the client computer 202. Profiling begins with the observer module 208 accessing a predetermined set of data targets for building the client profile 210. The set of data targets are preferably selected to provide a robust source of data for processing into a meaningful and versatile client profile 210. The data targets include information stored on the client computer 202, information accessible over the network 206, as well as behavioral data which can be obtained by monitoring the user's 204 activities on the computer 202 and over the network 206.

The observer 208 then analyzes the collected and retrieved information using data mining techniques. Structured data items within the collected and/or retrieved information, such as e-mail addresses or URLs, are stored in dedicated fields within the client profile 210. Unstructured data items within the collected and retrieved information, such as pure text, however are first statistically analyzed. The statistical analysis includes, first identifying a set of keywords and a set of key phrases within the unstructured data items and then, calculating a frequency of occurrence for each keyword and key phrase within the data item. The keywords, key phrases, and their respective calculated frequencies of occurrence are then stored in the client profile 210. If the keyword or key phrase already exists within the client profile 210, their frequencies of occurrence are combined. Preferably, the unstructured data itself is not stored within the client profile 210. The client profile 210 data structure is preferably that of a relational database upon which queries can be easily performed.

Thus the present invention's observer 208, by collecting, retrieving, and analyzing, information from the data targets, effectively captures the user's 204 tacit knowledge, which the user 204 themselves may not even be conscious of having knowledge, expertise, or an interest in.

In order to maximize the user's 204 privacy and thereby encourage broad user participation within the information market, the client profile 210 is preferably stored only on the client computer 202, however the profile 210 may also be stored remotely either in encrypted or password protected form and viewable only by the user 204. Also to toward this goal, the user 204 is also preferably given an option of erasing their client profile 210, or having the observer 208 rebuild a new client profile for the user 204. A high degree of user privacy encourages users to permit the system 200 to build very rich user profiles which go far beyond those users would otherwise voluntarily disclose to a central database.

Figure 4:
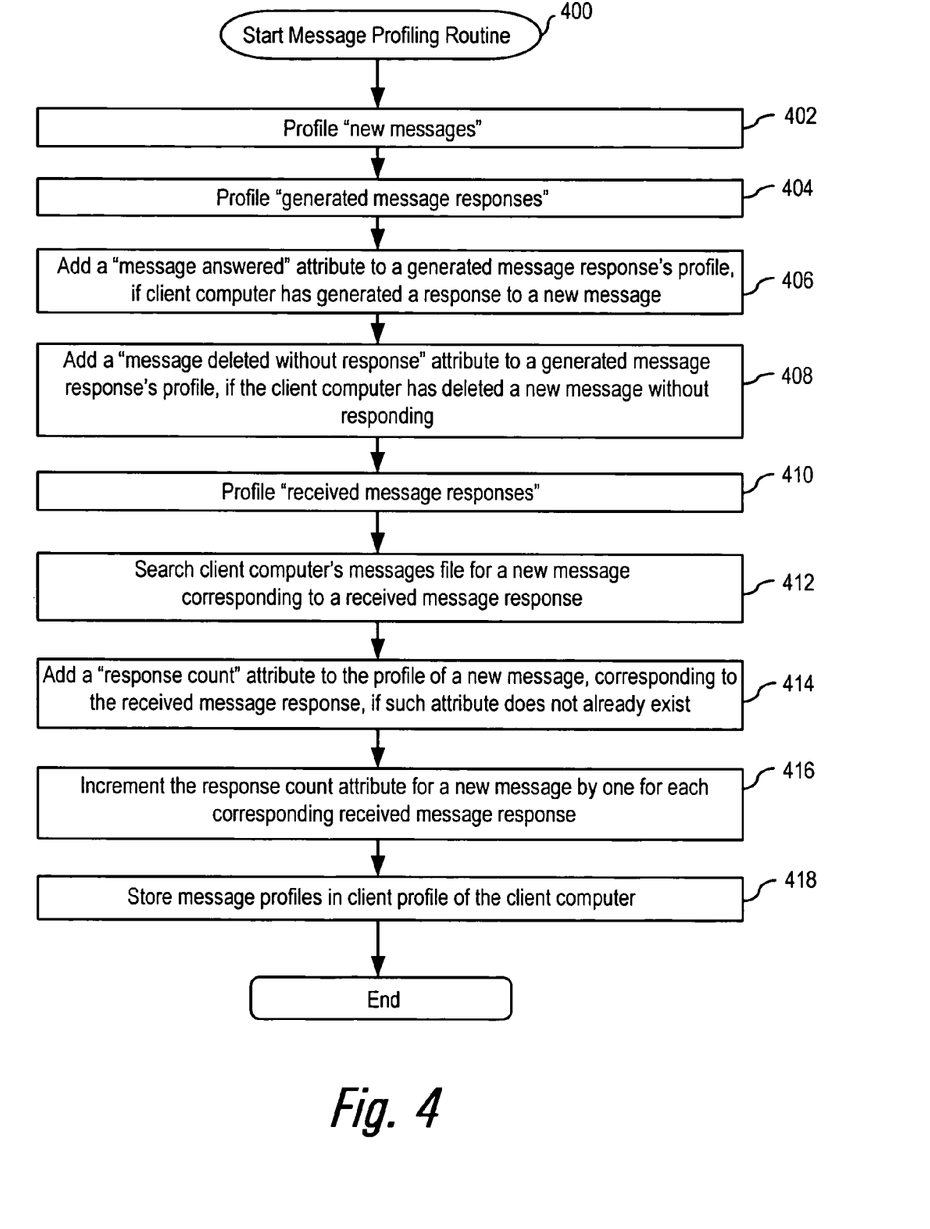
FIG. 4 is a flowchart of one embodiment of a method for adding message response information to a client profile.

While a general description of the client profile 210 has just been presented, client profiles 210 can vary in their particular implementation. FIG. 4 describes an implementation of the client profile 210 which monitors responses to messages sent over the network 206.

FIG. 4 is a flowchart of one embodiment of a method 400 for adding message response information to the client profile 210. Messages traverse the network 206 in the following manner. First an original message is generated by one of the client computers 202 (a.k.a. the sending client computer). This original message is received by other client computers (a.k.a. the receiving client computers) on the network 206. Some of these receiving client computers may generate responses to the original message. Those "responses" are then received by all the receiving client computers, which now includes, by definition, the sending client computer. New responses may then be generated to previous responses creating what is well known as a message "thread." In order to simplify discussion of the present invention's discussion, in light of these point of reference changes, the following definitions are presented for only one embodiment of the present invention.

A "new message" is herein defined as any message "received" by a client computer, having a new message Identification (ID) that the client computer has not received before. As such, each client computer preferably stores a copy of each new message ID received, perhaps in a log file. Note that for the purposes of this invention, "new messages" do not include those messages "generated" by the client computer, since the client computer does not score messages which the client computer itself generates. If the new message is part of a thread, the new message will also have a conversation ID, which the client computer may or may not have received before.

A "message response" is herein defined, as a message either "received" or "generated" by the client computer having a message response ID. The message response ID preferably includes: the new message ID prefixed by a "reply-to" text string. An important conceptual clarification, regarding the "new message" and "message response" distinction, is that "received message responses" are also themselves "new messages," while "generated message responses" are not.

Thus each message, transmitted as a part of a message thread, preferably has at least three different IDs included within the message. A first ID is the new message ID, discussed above, which is generated each time a message is sent regardless of whether the message is new or is a response. A second ID is the message response ID, also discussed above. And, the third ID is the conversation ID. All messages within the thread share the same conversation ID.

For example, client A sends a message with root message ID "1234" and conversation ID "567." Client B receives this message, along with the two IDs, and classifies it as a "new message" since client B has not received this message before. Client B generates and appends a new message ID "890," a message response ID "reply-to 1234," and conversation ID "567" to the message response broadcast back over the network 206 to Client A. Those skilled in the art will recognize and that there are many other ways of distinguishing "new messages" from "message responses" other than that just discussed.

As will be elaborated upon elsewhere in this specification, "received" message responses are used to tally a "response count" and "generated" message responses are used to monitor which messages have been "answered" and which have been "deleted" on the client computer 202, either by the user 204 or automatically. Also, for the purposes of this patent application the terms "message response" and an "message answer" are synonymous; and if a message has been "answered" and then subsequently "deleted," the message is still defined as a "message answered."

The method begins in step 402 where the observer module 208 profiles the client computer's 202 "new messages." As discussed above, profiling typically involves generating expertise vectors for a message by extracting various structured data items from the message as well as analyzing various unstructured data items within the message. Next begins in step 404 the observer module 208 profiles the client computer's 202 "generated message responses" in a manner similar to how new messages are profiled. In step 406, the observer module 208 adds a "message answered" attribute to the generated message response's profile, if the client computer 202 has generated a response to a new message. In step 408, the observer module 208 adds a "message deleted without response" attribute to the generated message response's profile, if the client computer 202 has deleted a new message without responding. Note that after message responses have been profiled, they may or may not be deleted from the messages file 236 in order to conserve memory resources on the client computer 202.

Then in step 410 the observer module 208 profiles the client computer's 202 "received message responses" in the same way as new messages are profiled, since as discussed above, "received message responses" are the same as "new messages." Then in step 412 the observer module 208 searches the messages file 236 for a new message corresponding to the received message response. Next in step 414, the observer module 208 adds a "response count" attribute to the profile of the new message corresponding to the received message response, if such attribute does not already exist. In step 416 the observer module 208 increments the response count attribute for that new message by one for each corresponding received message response in the messages file 236.

In step 418, all message profiles are stored in the client profile 210.

Message Generation

Next to be described is a system and method for generating messages in step 304 using the present invention. Messages are herein defined to include a wide variety of communications known to those skilled in the art, including any communication seeking, sending, and/or culling information from an information market. Thus messages can include questions, announcements, and/or information processing routines. First, the user 204 accesses a user interface module 228.

The user interface module 228 preferably includes a set of software modules for interfacing with the user 204. Such modules at a minimum include the e-mail client 230, which stores a predetermined set of e-mail messages 221, and the Internet client 232, which stores information in the web page cache 217. These two modules 230 and 232 provide the user 204 with alternate ways of using the present invention and preferably, both contain similar functionality, such as text windows and folders for storing messages both sent and received.

Through the user interface module 228, the user 204 initiates the message generating process, such as by clicking on an "Ask a Question" button in a toolbar within the user interface. In response, the user interface module 228 displays a number of pre-defined message types to the user 204.

After a message has been generated it is preferably assigned a globally unique identifier and stored in a messages database 236. The network module 216 periodically scans the message database 236 for new messages generated by the user 204. Then in step 306, a network protocol module 219 formats the new message according to an XML (Extensible Markup Language) protocol for transmission by the network module 216 over the network 206. Both a client computer sending the message and a client computer receiving the message must be apprised of the particular XML protocol used to format the message, in order for communication to occur.

Message Transmission

Next in step 308, the network module 216 transmits the message over a predetermined portion of the computer network 206. As mentioned above, when the computer client 202 transmits a message over the network 206 it is called a sending client, while when the computer client 202 receives a message over the network 206 it is called a receiving client. Thus in normal operation, all client computers function as both sending and receiving clients.

While messages transmitted over the peer-to-peer network 226 achieve a high level of anonymity, many messages will likely be transmitted over the e-mail network 222 or displayed on a web 218 site in order to advertise the present invention and thereby build-up the peer-to-peer network 226.

However, regardless of over which network portion the message is sent, each receiving client having the present invention installed stores a copy of the XML encoded message in their respective messages database.

Message Scoring

For purpose of the discussion to follow, functionality within the client computer 202 for scoring received messages is discussed as if the client computer 202 was one of the receiving client computers. Such a context switch is appropriate because preferably each client computer contains a complete and self contained version of the present invention's software.

In step 310, the system module 234 within the receiving client computer 202 retrieves, and commands a scoring module 238 to score, newly received messages stored in the messages database 236. Messages are scored using a series of "rules" herein also labeled as "conditionals." Conditionals come in two main varieties, Boolean or Quasi-Boolean and Fuzzy. Boolean and Quasi-Boolean conditionals are encoded as XML in the received message and are used to generate a "filter score" and return a score of "1" if true or "0" if false. Quasi-Boolean conditionals, however, return a small fractional score, such as "0.1," if false. Each piece of XML in a message can be evaluated by a Java object. Fuzzy conditionals return a decimal score anywhere between "1" and "0" and are used to generate a "statistical score." Scoring is performed by the scoring module 238 by comparing structured and unstructured data within a received message with structured and unstructured data stored in the receiving client's 204 client profile 210. New conditionals can easily be added.

Filter Score

Sending clients may insert one or more optional filters into a message, which define "structured" data items and/or "keywords/key-phrases" which the sending client prefers the receiving client to meet, before the message is displayed to the receiving client. In alternate embodiments, however, the filters may be required. The scoring module 238 then attempts to match the optional filtering criteria to data within the client profile 210 of the receiving client. If a match is found, a filter score of "1" is assigned to that filtering criteria. If a match is not found, a "fractional filter score" is assigned to that filtering criteria. Those skilled in the art will recognize that other filter scoring techniques may also be used.

Statistical Score

While the filter score compares a receiving client's client profile 210 to a sending client's filtering criteria, the statistical score is in contrast a fuzzy conditional which compares the receiving client's client profile 210 to not only the sending client's filtering criteria and but also content within the message's message field 604.

Received messages are preferably scored using a predetermined set of statistical information retrieval techniques, such as linguistic analysis/scoring, known to those skilled in the art. Information retrieval techniques are commonly known to be used for accessing and analyzing large blocks of data and then extracting all or selected portions of such data according to a wide variety of methods.

To begin, the scoring module 238 extracts keywords and key-phrases from the received message. Then, the scoring module 238 generates an "expertise vector" for the received message 602. The expertise vector's magnitude equals a relative term frequency of each of the keywords and/or key-phrases within the message 602.

The scoring module 238 then generates an expertise vector, and magnitude thereof, for the receiving client's client profile 210 using the extracted keywords and/or key-phrases. The scoring module 238 primarily analyzes the receiving client's client profile 210 in order to calculate this expertise vector, however, the scoring module 238 may also analyze various files or caches stored on the recipient's client computer 202.

Then, the scoring module 238 generates the statistical message score by comparing the magnitude of the received message expertise vector with the magnitude of the receiving client's client profile expertise vector for each key-word and key-phrase. This statistical message score is equal to a "distance" or "angle" between these two expertise vectors. Distance calculations between expertise vectors are well known in the art of linguistic analysis. Finally, the statistical score is normalized to between "0" and "1." Those skilled in the art will recognize that other statistical scoring techniques may also be used.

Overall Score

An overall score for the received message with respect to the receiving client is then calculated by combining the filter and the statistical scores. Those skilled in the art will recognize that there are many different ways to combine theses scores. Regardless of how the overall score is calculated, the overall score is meant to represent a percentage likelihood (on a 0% to 100% scale) that the receiving client will be able to respond to the received message with a correct and/or useful answer.

In a preferred embodiment, the scoring module 238 adds all of the filter scores, corresponding to the filtering criteria, and the statistical score, and divides the total by a total number of filter and statistical scores, thus normalizing the overall score. For example, if the sending client has specified three filters within the filtering criteria, the three filters are given 75% of the overall score, and 25% of the overall score is based on the statistical score.

In an alternate embodiment however, the sending client can XML encode a custom method for generating the overall score, such as by specifying weights to be assigned conditionals, or by performing logical operations on the filtering and statistical scores themselves. For example, in the first case, the sending client can require that the fuzzy conditional comprises 75% of the overall score, while all of the quasi-Boolean conditionals only account for 25% of the overall score. In the second case, the sending client can require that a first filter score AND a second filter score NOT be above a predetermined score. Such logical operands (i.e. AND, NOT, etc.) can be useful disseminating message information to receiving clients who may not yet be aware of the information, and thus who would otherwise have scored low.

In other alternate embodiments, hierarchical rules may be encoded by the sending client into the message which specify different ways of calculating the overall score, depending upon scores assigned to one or more filtering and/or statistical conditionals.

After normalization, if each of the conditional scores are between "0" and "1," then the overall score is similarly normalized to between "0" and "1." The normalized overall score is then converted to a percentage for display to the receiving client.

Thus the filtering and scoring methodologies presented, coupled with the private client profiles and the profile-richness that implies, allows users to define "expertise" in a way which is uniquely personal to that user.

Modified Scoring Based On Previous Message Responses

While a general description of message scoring has just been presented, message scoring can vary for each particular implementation. More specifically, general scoring can be modified based on those messages a client user has responded to as well as those messages which the client user has deleted without responding to. This history can be used to either positively or negatively bias a new message's score so that only messages more relevant to the user's 204 interests are scored highly.

Similarly, general scoring can be modified to take into account a number of network 206 responses generated in response to a particular message. Monitoring how many responses have already been generated for received messages provides a way to ensure that messages receive neither too many nor too few responses.

For instance, a message containing the word JAVA, broadcast over a network consisting mainly of receiving clients whose users are computer programmers, may score very highly at each receiving client. If left unchecked, literally every user may respond, perhaps very similarly, and wasting the time of not only the users who respond, but also the sending client's user who must then wade through all of the responses. In contrast, a hardware message broadcast to that same group of computer programmers may score very poorly at each receiving client, and thus may never result in a response.

Figure 5:
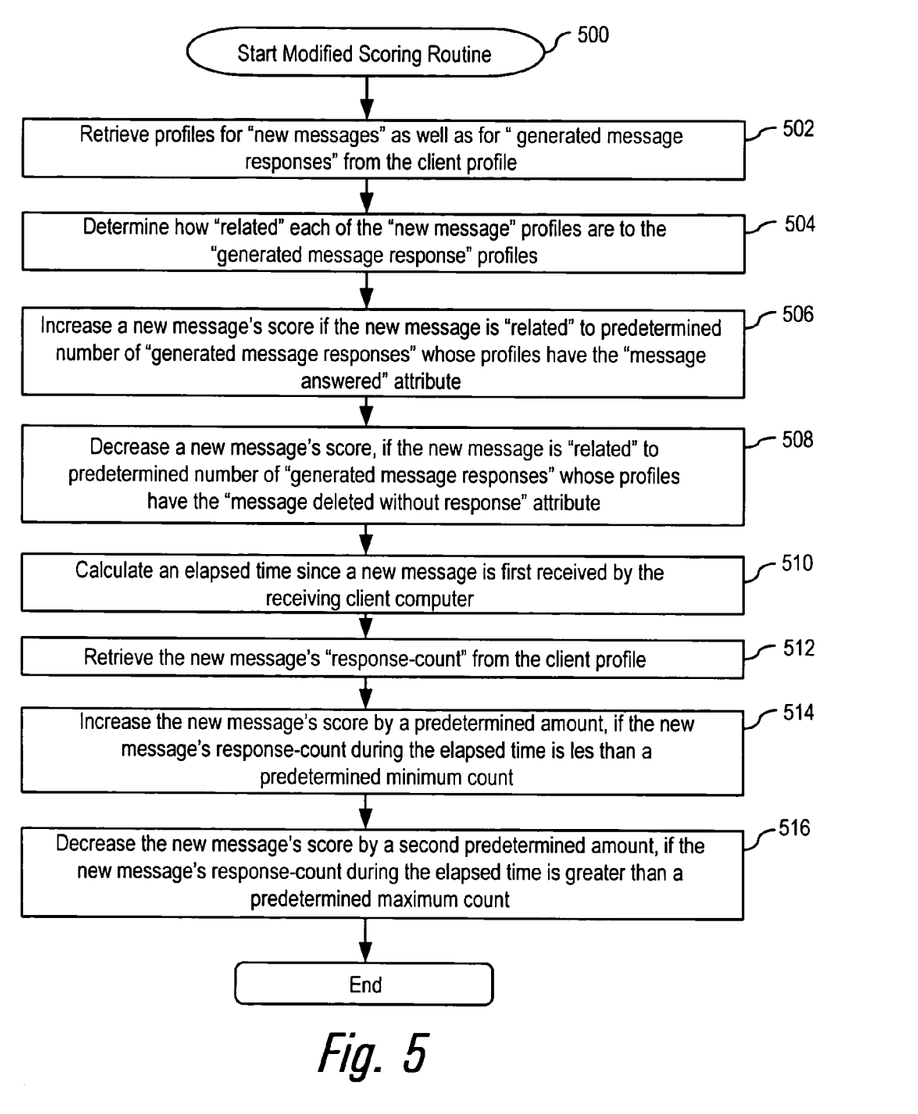
FIG. 5 is a flowchart of one embodiment of a method for scoring new messages based on message responses.

FIG. 5 is a flowchart of one embodiment of a method 500 for scoring "new messages" based on message responses, which addresses the above concerns. The method begins in step 502 where profiles for "new messages" as well as for the "generated message responses" are retrieved from the client profile 210.

In step 504, the scoring module 238 determines how "related" each of the "new message" profiles are to the "generated message response" profiles. Messages are herein defined as "related" if a "distance" between their expertise vectors is less than or equal to a predetermined distance. In step 506, the scoring module 238 increases a new message's score if the new message is "related" to a predetermined number of "generated message responses" whose profiles have the "message answered" attribute. In step 508, the scoring module 238 decreases a new message's score, if the new message is "related" to predetermined number of "generated message responses" whose profiles have the "message deleted without response" attribute. Note, that a degree of "relatedness" required for "generated messages responses" having the "message answered" attribute to increase a new message's score can be different than that required for "generated messages responses" having the "message deleted without response" attribute to decrease a new message's score. Thus the greater the number of previously answered messages which are related to the new message, the higher the new message's score. Similarly, the greater the number of previously deleted messages which are related to the new message, the lower the new message's score. For example, a sending client transmitting a new JAVA message can filter out receiving clients who have not answered at least the ten previous messages related to the new JAVA message.

Note that several other "attributes" can also be added to the "generated message response" profiles, including an "client user interested" attribute, set when a client user opens and reads a new message but has not yet responded to nor deleted the message, as well as an "client user ignored" attribute, set when a client user hasn't yet opened the new message.

Also, in an alternative embodiment, keywords and key-phrases within the user's 204 client profile 210 can be given less weight each time the user 204 deletes a new message containing such keywords or key-phrases, and given more weight each time the user 204 responds to a new message containing the keywords or key-phrases. In this embodiment, separate profiles are not kept for messages responded to or messages deleted. Instead, the user's 204 message behavior just directly becomes part of the client profile 210 for the user 204.

In step 510, the scoring module 238 calculates an elapsed time since a "new message" is first received by the client computer 202 over the network 206. This calculation is performed by comparing a time-tag associated with the new message to current system time on the client computer 202. In step 512, the scoring module 238 retrieves the new message's "response-count" from the client profile 210.

In step 514, the scoring module 238 increases the new message's score by a predetermined amount, if the new message's "response-count" during the elapsed time is less than a predetermined minimum count. Thus a new message's score is increased if at least a predetermined minimum number of "received message responses" have not been observed over the network 206. The new message's score is preferably increased at predetermined intervals based on a linear or non-linear function of the number of responses and amount of time which has elapsed. In this way, the scores of new messages which are "less-popular" are gradually increased, thereby causing such new messages to rise toward the top of a receiving client's in-box and get greater attention from the receiving client 202.

In step 516, however, the scoring module 238 decreases the new message's score by a second predetermined amount, if the new message's response-count during the elapsed time is greater than a predetermined maximum count. Thus a new message's score is decreased if a predetermined maximum number of "received message responses" have already been observed over the network 206. The new message's score is preferably decreased at predetermined intervals based on a linear or non-linear function of the number of responses and amount of time which has elapsed. In this way, the scores of new messages which are "very-popular" are gradually decreased, thereby causing such new messages to fall toward the bottom of a receiving client's in-box, making it less likely that the receiving client 202 will respond. By decreasing such message scores, sending clients 202 are not inundated with an excessive number of responses and receiving clients are not bothered with new messages which have already been adequately responded to.

Message Display and Response

In step 312, the received message is displayed to the receiving client preferably only if the message score exceeds a predetermined threshold. Messages are preferably displayed to the receiving client according to their respective score. As discussed above, the score represents a likelihood that the receiving client will find the message relevant to or within their expertise.

The receiving client then may select and respond to one of the messages. In step 314 a message response from the receiving client is sent over the network 206 back to the sending client anonymously or in an encrypted format. After step 314 the preferred method ends.

Processing Information from Other Sources Using the Present Invention

While the present invention has been discussed with respect to the generation, transmission and response to messages, the present inventions' scoring functionality is equally applicable toward processing other types of information as well. Other information includes data displayed within a current web page being viewed by the user 204. A relevance vector could be generated from said web page data and compared to the user's 204 expertise vector generated from the client profile 210. User's would be notified of a particular relevance of the currently viewed web page if the relevance and expertise vectors when compared yield a score which exceeds a predetermined threshold. In this way user's browsing the web could be apprised of particular web pages which may closely align with their interests and/or expertise.

Other information similarly processed and scored may include: normal e-mail messages which have not been generated using the present inventions' functionality; files downloaded from the central server 224 or received from some other source; or expertise information stored on a central enterprise database. Those skilled in the art will know of other information sources to which the present invention may also be successfully applied.

While one or more embodiments of the present invention have been described, those skilled in the art will recognize that various modifications may be made. Variations upon and modifications to these embodiments are provided by the present invention, which is limited only by the following claims.

What is claimed is:

1. A method for knowledge management, comprising:
generating a client computer profile from a set of data items on a client computer;
generating a set of message response profiles from a corresponding set of message responses;
generating a set of new message profiles from a corresponding set of new messages;
storing the profiles on the client computer; and
scoring a new message with respect to the client and message response profiles wherein each of the generating elements includes: generating expertise vectors from data items in the client computer and the messages.

2. A method for knowledge management comprising:
generating a client computer profile from a set of data items on a client computer;
generating a set of message response profiles from a corresponding set of message responses which includes generating a set of generated message response profiles from a corresponding set of generated message responses;
generating a set of new message profiles from a corresponding set of new messages;
storing the profiles on the client computer; and
scoring a new message with respect to the client and message response profiles.

3. The method of claim 2, wherein the scoring element includes: determining how related the new message profile is to the set of generated message response profiles.

4. The method of claim 3, wherein the determining element includes: determining that messages are related if a distance between the messages' expertise vectors is less than or equal to a predetermined distance.

5. The method of claim 2, wherein: the generating a set of generated message response profiles element includes, adding a message answered attribute to a generated message response profile, if a corresponding new message has been answered; and the scoring element includes, increasing a new message's score if the new message is related to a predetermined number of generated message responses having the message answered attribute.

6. The method of claim 2, wherein: the generating a set of generated message response profiles element includes, adding a message deleted without response attribute to a generated message response profile, if a corresponding new message has been deleted; and the scoring element includes, decreasing a new message's score, if the new message is related to a predetermined number of generated message responses having the message deleted without response attribute.

7. The method of claim 2, wherein: the generating a set of generated message response profiles element includes, adding a client user interested attribute to a generated message response profile, if a corresponding new message has been opened; and the scoring element includes, increasing a new message's score if the new message is related to a predetermined number of generated message responses having the user interested attribute.

8. The method of claim 2, wherein: the generating a set of generated message response profiles element includes, adding a client user ignored attribute to a generated message response profile, if a corresponding new message has not been opened; and the scoring element includes, decreasing a new message's score if the new message is related to a predetermined number of generated message responses having the user ignored attribute.

9. The method of claim 2, wherein the generating a set of generated message response profiles element includes, adding a message answered attribute to a generated message response profile, if a corresponding new message has been answered; and adding a message deleted without response attribute to a generated message response profile, if a corresponding new message has been deleted; and the scoring element includes, determining that a new message and a generated response message having the message answered attribute are related if a distance between the messages' expertise vectors is less than or equal to a first predetermined distance; and determining that a new message and a generated response message having the message deleted without response attribute are related if a distance between the message' expertise vectors is less than or equal to a second predetermined distance.

10. A method for knowledge management, comprising:
generating a client computer profile from a set of data items on a client computer;
generating a set of message response profiles from a corresponding set of message responses;
generating a set of new message profiles from a corresponding set of new messages;
storing the profiles on the client computer;
scoring a new message with respect to the client and message response profiles;

identifying a set of received message responses corresponding to a new message, from within the message responses;

adding a response count attribute to a new message profile corresponding to the new message; and incrementing the response count attribute by one for each received message response in the set of received message responses.

11. The method of claim 10, wherein the scoring element includes:

calculating an elapsed time since a new message is first received by tile client computer; retrieving the new message's response-count from the client profile; and periodically increasing the new messages score by a predetermined amount, if the new message's response-count during the elapsed time is less than a predetermined minimum count.

12. The method of claim 10, wherein the scoring element includes:

calculating an elapsed time since a new message is first received by the client computer, retrieving the new message's response-count from the client profile; and periodically decreasing the new message's score by a predetermined amount if the new message's response-count during the elapsed time is greater than a predetermined maximum count.

13. The method of claim 10, wherein the identifying element includes:

identifying a message response ID within a received message response which corresponds with a new message ID within the new message.

14. A method for knowledge management, comprising:

generating a client computer profile from a set of data items on a client computer;

generating a set of message response profiles from a corresponding set of message responses;

generating a set of new message profiles from a corresponding set of new messages;

storing the profiles on the client computer;

scoring a new message with respect to the client and message response profiles; and defining new messages as any message received by the client computer, having a message ID not previously observed.

15. A method for knowledge management, comprising:

generating a client computer profile from a set of data items on a client computer;

generating a set of message response profiles from a corresponding set of message responses;

generating a set of new message profiles from a corresponding set of new messages;

storing the profiles on the client computer; scoring a new message with respect to the client and message response profiles; and defining message responses as any messages received or generated by the client computer, which correspond to a previously received new message.

16. A system for knowledge management, comprising:

means for generating a client computer profile from a set of data items on a client computer;

means for generating a set of message response profiles from a corresponding set of message responses;

means for generating a set of new message profiles from a corresponding set of new messages;

means for storing the profiles on the client computer;

means for scoring a new message with respect to the client and message response profiles;

means for identifying a set of received message responses corresponding to a new message, from within the message responses: means for adding a response count attribute to a new message profile corresponding to the new message; and means for incrementing the response count attribute by one for each received message response in the set of received in message responses.

17. A computer-usable medium embodying computer program code for commanding a computer to effect knowledge management, comprising:

generating a client computer profile from a set of data items on a client computer; generating a set of message response profiles from a corresponding set of message responses;

generating a set of new message profiles from a corresponding set of new messages;

storing the profiles on the client computer;

scoring a new message with respect to the client and message response profiles;

identifying a set of received message responses corresponding to a new message, from within the message responses;

adding a response count attribute in a new message profile corresponding to the new message; and incrementing the response count attribute by one for each received message response in the set of received message responses.

* * * * *

UNITED STATES PATENT AND TRADEMARK OFFICE
CERTIFICATE OF CORRECTION

PATENT NO. : 7,389,290 B2  Page 1 of 1
APPLICATION NO. : 10/210331
DATED : June 17, 2008
INVENTOR(S) : Eytan Adar et al.

It is certified that error appears in the above-identified patent and that said Letters Patent is hereby corrected as shown below:

In column 11, line 54, in Claim 2, after "management" insert -- , --.

In column 12, line 41, in Claim 9, after "wherein" insert -- : --.

In column 12, lines 54-55, in Claim 9, delete "message' expertise" and insert -- messages' expertise --, therefor.

In column 13, line 12, in Claim 11, delete "tile" and insert -- the --, therefor.

In column 13, line 14, in Claim 11, delete "messages" and insert -- message's --, therefor.

In column 13, line 21, in Claim 12, delete "computer," and insert -- computer; --, therefor.

In column 13, line 24, in Claim 12, after "amount" insert -- , --.

In column 14, line 23, in Claim 16, delete "responses:" and insert -- responses; --, therefor.

In column 14, line 27, in Claim 16, after "received" delete "in".

In column 14, line 43, in Claim 17, delete "in" and insert -- to --, therefor.

Signed and Sealed this

Sixteenth Day of December, 2008

JON W. DUDAS
*Director of the United States Patent and Trademark Office*